(12) United States Patent
Penn

(10) Patent No.: US 6,373,066 B1
(45) Date of Patent: Apr. 16, 2002

(54) THERMAL NEUTRON DETECTOR USING A SCINTILLATOR WITH BACKGROUND GAMMA RAY SHIELDING

(75) Inventor: David G. Penn, Woodmere, OH (US)

(73) Assignee: Saint-Gobain Industrial Ceramics, Inc., Worcester, MA (US)

( * ) Notice: Subject to any disclaimer, the term of this patent is extended or adjusted under 35 U.S.C. 154(b) by 0 days.

(21) Appl. No.: 09/379,131

(22) Filed: Aug. 20, 1999

(51) Int. Cl.[7] .................................................. G01T 3/06
(52) U.S. Cl. ............................ 250/390.11; 250/363.02; 250/370.09; 250/370.11; 250/483.1
(58) Field of Search ........................ 250/363.02, 370.09, 250/370.11, 390.11, 483.1

(56) References Cited

U.S. PATENT DOCUMENTS

| | | | | |
|---|---|---|---|---|
| 3,781,564 A | * | 12/1973 | Lundberg | 250/390.01 |
| 4,090,083 A | * | 5/1978 | Wyvill | 250/390.01 |
| 4,158,773 A | | 6/1979 | Novak | 250/361 |
| 4,883,956 A | * | 11/1989 | Melcher et al. | 250/483.1 |
| 4,994,673 A | | 2/1991 | Perna et al. | 250/483.1 |
| 5,869,836 A | | 2/1999 | Linden et al. | 250/361 |

OTHER PUBLICATIONS

Nicholas Tsoulfanidis "Measurement and Detection of Radiation" (1983) 424 and 429.

* cited by examiner

*Primary Examiner*—Constantine Hannaher
*Assistant Examiner*—Andrew Israel
(74) *Attorney, Agent, or Firm*—Volker R. Ulbrich; Donald Bulson

(57) ABSTRACT

A thermal neutron detector comprises an inorganic scintillation crystal, an inner sleeve on said scintillation crystal and including boron-10, and an outer lead sleeve on said inner sleeve for shielding gamma rays from the inner layer. The boron-10 may be carried in a resiliently compressible silicone cast on the crystal to form a sleeve which functions to mechanically support the crystal inside a detector casing. The resiliently compressible, thermal neutron absorbing layer may also be used in other applications as a thermal neutron shield.

20 Claims, 1 Drawing Sheet

THERMAL NEUTRON DETECTOR USING A SCINTILLATOR WITH BACKGROUND GAMMA RAY SHIELDING

FIELD OF THE INVENTION

The invention herein described relates generally to thermal neutron detectors and more particularly to an indirect thermal neutron detector including a scintillation detector with background gamma ray shielding.

BACKGROUND OF THE INVENTION

Many nuclear measurements are made in the petroleum industry. Such measurements have been made by scintillation detectors using thallium-activated sodium iodide crystals that are very effective in detecting gamma rays. The crystals have been enclosed in metal tubes or casings to form a crystal package. The crystal package has an optical window at one end of the casing which permits radiation induced scintillation light to pass out of the crystal package for measurement by a light sensing device (photosensor) such as a photomultiplier tube coupled to the crystal package. The photomultiplier tube converts the light photons into electrical pulses that are shaped and digitized by associated electronics. Pulses that exceed a threshold level are registered as counts that may be transmitted up hole to analyzing equipment or stored locally.

Other detectors are used for detecting neutrons at thermal energies. Existing neutron detectors suffer from a variety of drawbacks which limit their application in certain environments such as in a well bore where it is subjected to high temperatures and high vibrations when measuring while drilling. Examples of neutron detectors known in the art include counters or ionization chambers filled with boron-containing gases (e.g., boron fluoride enriched with boron-10) in which neutrons are detected by the production of charged particles when neutrons react with boron-10. The charged particles are accelerated by the electric field toward a cathode or anode where they are collected to produce a pulsed voltage signal. The electric field is developed by a large voltage potential between a long thin wire and the chamber casing. A problem with this type of detector is electric field fluctuation which arises from the dynamics of the thin wire. The fluctuation produces a signal that is difficult to disassociate from the neutron induced signal.

A related type of neutron detector is a boron-lined counter wherein boron-10 is coated on the wall of the counter which may be filled with a gas other than boron fluoride. In this case the reactions take place in the thin coating close to the wall, with only one of the two charged particles having a chance of entering the interior volume of the counter while the other stops in the wall. This type of counter also suffers from the problem of electric field fluctuation when subjected to vibration.

Other neutron detectors use boron-doped plastic scintillators. However, these detectors cannot withstand the high temperatures encountered in down hole applications in the petroleum industry. Other scintillating materials can also be used, such as lithium-6, but such materials not only detect background gammas but also alpha particles and tritons associated with the lithium-6 neutron interaction.

SUMMARY OF THE INVENTION

The present invention solves problems that were previously unrecognized or thought to be insoluble, by using approaches that are contrary to conventional teachings. The invention satisfies a long felt need for a simple thermal neutron detector and particularly one that can be used in high temperature and/or high vibration environments. Still more particularly, the present invention enables the use of common inorganic scintillation crystals, particularly thallium activated sodium iodide crystals, for detecting thermal neutrons.

In accordance with the invention a thermal neutron detector comprises an inorganic scintillation crystal covered by an inner layer including a thermal neutron radiation absorbing material and an outer layer including a gamma ray shielding material covering the inner layer.

In a preferred embodiment of the detector, the thermal neutron absorbing material includes boron-10 and the shielding layer is composed of lead or other material that blocks environmental gamma rays from interaction with the boron-containing layer. Thermal neutrons enter the detector and are absorbed by boron-10 in the inner layer covering the scintillation crystal. The boron then decays by emitting an alpha particle and leaving a lithium-7 atom at an excited level. The lithium-7 then decays by emitting a 480 keV gamma ray which is detected by the scintillation crystal. The outer layer functions to shield a large portion of background gamma rays as well as Compton scattered gamma rays from interaction with the boron-containing layer.

Further in accordance with the invention, the thermal neutron absorbing material is uniquely packaged between the outer shielding layer and the scintillation crystal so as to reduce the susceptibility of the detector to signal noise induced by vibration and to increase the ruggedness of the detector. This is effected by forming the thermal neutron absorbing inner layer from a mixture of the thermal neutron absorbing material and a resiliently compressible carrier material. A preferred carrier material is silicone or resiliently compressible compositions containing silicone. As is preferred, the mixture may be cast on the crystal to form a sleeve which functions to mechanically support the crystal inside a detector casing.

According to another aspect of the invention, a ruggedized detector for detecting radiation other than thermal neutrons includes a detector element that detects a radiation of interest and also thermal neutrons, and a resiliently compressible shield composed of a mixture of an elastomer and thermal neutron absorbing material.

The foregoing and other features of the invention are hereinafter fully described and particularly pointed out in the claims, the following description and annexed drawings setting forth in detail certain illustrative embodiments of the invention, these embodiments being indicative, however, of but a few of the various ways in which the principles of the invention may be employed.

DETAILED DESCRIPTION

Figure 1:
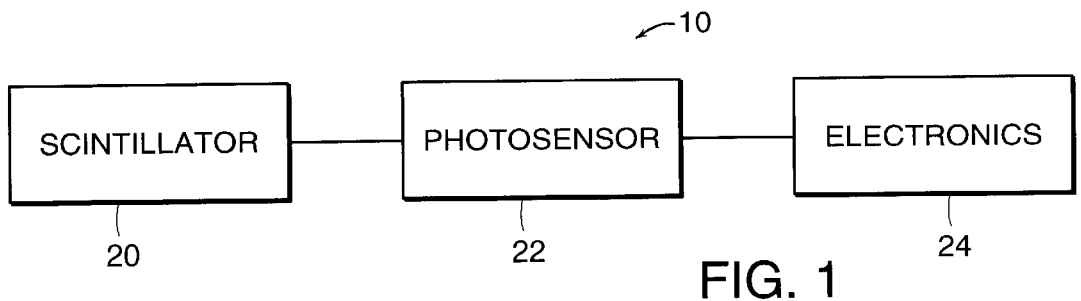
FIG. 1 is a diagrammatic illustration of a thermal neutron detector comprising a scintillation crystal package in accordance with the invention.

Referring now in detail to the drawings and initially to FIG. 1, a thermal neutron detector assembly 10 according to the present invention generally comprises a scintillation crystal package 20, a light sensing device such as a photomultiplier tube 22 and electrical/electronic circuitry 24 for supplying power to the light sensing device and analyzing the output of the light sensing device. The present invention provides a novel scintillation crystal package whereas the light sensing device and associated circuitry may be of conventional and well known design.

Figure 2:
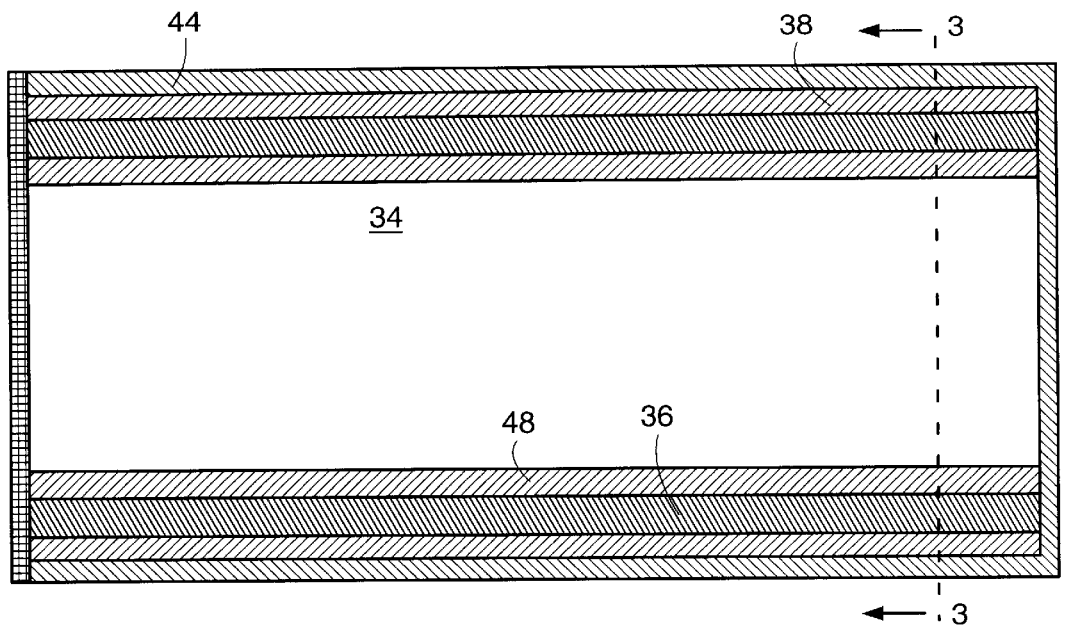
FIG. 2 is a cross-sectional view of the scintillation crystal package.
Figure 3:
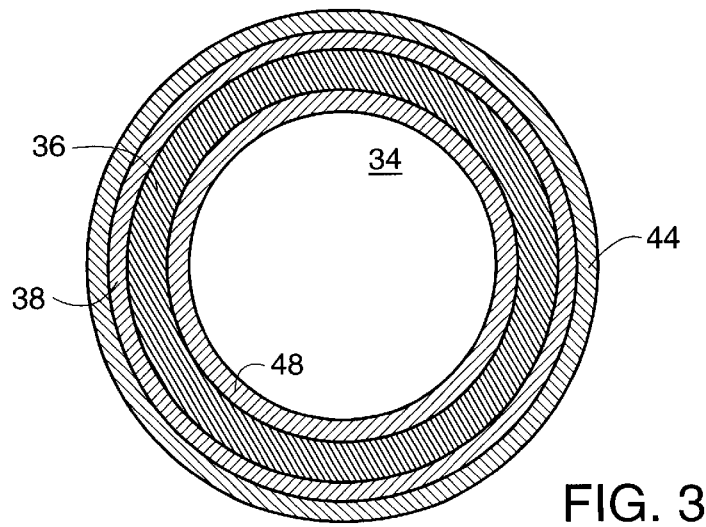
FIG. 3 is a cross-sectional view of the scintillation crystal package taken along the line 3—3 of FIG. 2.

Referring to FIGS. 2 and 3, the scintillation crystal package 20 comprises a scintillation crystal 34 which is covered by an inner layer 36 including a thermal neutron absorbing material and an outer layer 38 including a gamma ray shielding material which covers the inner layer. In the illustrated preferred embodiment, the scintillation crystal 34 has the shape of a right cylinder, and the inner and outer layers 36 and 38 are cylindrical sleeves or claddings that surround the outer cylindrical wall of the scintillation crystal as shown. It is contemplated that the invention may have application to crystals of other shapes and the layers may be applied to a crystal surface other than a cylindrical surface.

The cladded crystal may be enclosed within a casing 44 which may function to hermetically seal the scintillation crystal 34 from exposure to the surrounding environment, as may be important when using a hygroscopic scintillation crystal, such as a preferred thallium-activated sodium iodide crystal. In the illustrated preferred embodiment, the casing 44 is a tubular metal casing, preferably formed from aluminum, although a casing of other shape and/or material may be used as may be desired.

In a preferred embodiment of the detector 10 for detecting thermal neutrons, the thermal neutron absorbing layer includes boron-10 and the shielding layer is composed of lead or other material that blocks environmental gamma rays from interaction with the boron-containing layer. Thermal neutrons enter the detector and are absorbed by boron-10 in the inner layer covering the scintillation crystal. The boron then decays by emitting an alpha particle and leaving a lithium-7 atom at an excited level. The lithium-7 then decays by emitting a 480 KeV gamma ray which is detected by the scintillation crystal. The lead shielding layer functions to shield a large portion of background gamma rays as well as Compton scattered gamma rays from interaction with the boron-containing layer, thereby avoiding signal noise that otherwise would arise. The majority of the gamma rays that do not originate from the boron usually are created during the slowing down or thermalization process (inelastic scattering) of fast neutrons in a typical well logging application.

The present invention encompasses the use of thermal neutron absorbing materials other than boron-10, such as materials having a large absorption cross-section around the energy of interest and have a dominating mode of decay. Boron-10 is preferred as it is relatively abundant at a low cost and has a very large absorption cross-section at thermal energies. Boron-10 also decays very predictably, producing the 480 keV gamma ray about 98% of the time.

The present invention also encompasses the use of gamma ray shielding materials other than lead, such as materials having a high electron density.

Lead is preferred because it is inexpensive, easy to obtain and has a high electron density. Other materials such as uranium may be used., although less preferred.

The thermal neutron absorbing inner layer 36 preferably is formed from a mixture of the thermal neutron absorbing material (boron-10) and a resiliently compressible carrier material. A preferred carrier material is an elastomer, silicone or resiliently compressible compositions containing silicone, including for example silicone rubber which may be a fast setting silicone elastomer. A particular material may be a Sylgard 186/184 blend elastomer to which elemental boron is added. Sylgard resins are sold by Dow Corning Corporation of Midland, Mich. As is preferred, the mixture may be cast on the crystal to form a sleeve or boot which functions to mechanically support the scintillation crystal 34 inside the casing 44. The resilience of the composite inner layer 36 helps reduce the susceptibility of the detector to signal noise induced by vibration and to increase the ruggedness of the detector.

The thickness of the thermal neutron absorbing/shock absorbing layer 36 may be selected for a desired lifetime, efficiency and/or mechanical survivability expected of the detector for a given application. By increasing the amount of boron-10, the lifetime and efficiency of the detector can be increased. However, the higher the ratio of boron to elastomer, the stiffer the boot becomes and the less protection afforded by the boot to the crystal from shock. The boron-10 concentration should be at least about 0.50% and more preferably greater than about 1% boron-10. An exemplary mixture is about 20% elemental boron and about 80% silicone rubber. Elemental boron contains about 20% boron-10 and about 80% boron-11, which yields in the mixture about 4% elemental boron.

The concentration of boron-10 can be increased without sacrificing decreasing the shock absorbing performance of boot by using enriched boron-10 powder.

The scintillation crystal package 20 may be coupled in a known manner to the photomultiplier tube 22 (FIG. 1). To this end the casing 44 may be provided with a window at one axial end thereof for optical coupling to the photomultiplier tube (PMT) which converts the collected light photons into electrical pulses that are shaped and digitized by the associated electronics 24 (FIG. 1). The optical window should be made of a material transmissive to scintillation light given off by the scintillation crystal. The casing 44 may be closed at its other end and a spring or compression pad (not shown) may be provided to axially load the crystal and bias it toward the optical window to maintain an optical coupling to the PMT. A layer of suitable optical coupling material, for example silicone rubber, may be positioned between the front end face of the crystal and the inner face of the optical window. Also, if desired, a layer of reflecting material 48 may be provided around the scintillation crystal. The layer of reflecting material may be a white thin porous PTFE material tightly wrapped around the crystal and over which the inner layer may be applied, as by casting or slipping a preformed boot over the crystal. Examples of crystal mounting, reflector and boot arrangements are, for example, shown in U.S. Pat. Nos. 5,869,836, 4,994,673 and 4,158,773, which are hereby incorporated herein in their entireties. The present invention introduces a new component into the assembly, such being the gamma ray shielding layer which shields the inner layer from environmental gamma rays.

The neutron radiation absorbing material need not be incorporated in a carrier. Also, the neutron radiation absorbing material may be incorporated in carriers of other types, such as in mixture with a powder (or other particulate material) packed around or otherwise surrounding the crystal. Many known detectors use a powder packed around the crystal for various reasons and the neutron absorbing may be mixed with such powders or other packed materials to form the neutron absorbing layer of the present invention.

As will be appreciated by those skilled in the art, the sleeve or boot 36 containing a thermal neutron absorber may have other uses than that described in relation to a thermal neutron detector. For example, the boot may be used as a thermal neutron shield in those situations where it is desirable to shield a detector used to detect epi-thermal or fast neutrons. In this context, the crystal 34 (of a suitable material) or other detector element in its place would then function to detect epi-thermal or fast neutrons, and the lead shield 38 would be omitted.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A thermal neutron detector comprising an inorganic scintillation crystal covered by an inner layer including a thermal neutron absorbing material and an outer layer including a gamma ray shielding material on said inner layer.

2. A thermal neutron detector as set forth in claim 1, further comprising a photoelectric converter optically coupled to said scintillation crystal.

3. A thermal neutron detector as set forth in claim 1, wherein said thermal neutron absorbing material includes boron-10.

4. A thermal neutron detector as set forth in claim 3, wherein said gamma ray shielding material includes lead.

5. A thermal neutron detector as set forth in claim 4, wherein said scintillation crystal is a thallium-activated sodium iodide crystal.

6. A thermal neutron detector as set forth in claim 1, wherein said inner layer includes a thermal neutron absorbing material in a resiliently compressible carrier.

7. A thermal neutron detector as set forth in claim 6, wherein said resiliently compressible carrier includes silicone.

8. A thermal neutron detector as set forth in claim 7, wherein said inner layer is formed by casting a mixture of said thermal neutron absorbing material and said resiliently compressible carrier on said scintillation crystal.

9. A thermal neutron detector as set forth in claim 1, wherein said thermal neutron absorbing material is a powder and said powder is mixed with another particulate material that is packed around the scintillation crystal to form the inner layer.

10. A thermal neutron detector as set forth in claim 1, wherein the scintillation crystal is responsive to gamma rays.

11. A thermal neutron detector comprising a scintillation crystal, an inner sleeve surrounding said crystal and containing a thermal neutron absorbing material, and an outer sleeve surrounding said inner sleeve and containing a gamma ray shielding material.

12. A thermal neutron detector as set forth in claim 11, wherein said inner sleeve is formed by casting a mixture of said thermal neutron absorbing material and a resiliently compressible carrier on said scintillation crystal.

13. A thermal neutron detector as set forth in claim 11, further comprising a photoelectric converter optically coupled to said scintillation crystal.

14. A thermal neutron detector as set forth in claim 11, wherein said thermal neutron absorbing material includes boron-10.

15. A thermal neutron detector as set forth in claim 11, wherein said gamma ray shielding material includes lead.

16. A thermal neutron detector as set forth in claim 11, wherein said scintillation crystal is a thallium-activated sodium iodide crystal.

17. A thermal neutron detector as set forth in claim 11, wherein said inner layer includes a thermal neutron absorbing material in a resiliently compressible carrier.

18. A thermal neutron detector as set forth in claim 11, wherein the scintillation crystal is responsive to gamma rays.

19. A detector for detecting radiation other than thermal neutrons comprising a detector element that detects a radiation type or types of interest and also thermal neutrons, and a resiliently compressible shield surrounding said detector element and composed of a mixture of an elastomer and thermal neutron absorbing material.

20. A radiation detector as set forth in claim 19, wherein said thermal neutron absorbing material includes boron-10.

* * * * *